United States Patent [19]

Neff

[11] Patent Number: 5,798,582

[45] Date of Patent: Aug. 25, 1998

[54] LINEAR VOICE ACTUATOR WITH REPLACEABLE MAGNETIC COIL

[75] Inventor: Edward A. Neff, Rancho Santa Fe, Calif.

[73] Assignee: Systems, Machines, Automation Components, Corporation, Carlsbad, Calif.

[21] Appl. No.: 620,404

[22] Filed: Mar. 22, 1996

[51] Int. Cl.⁶ .................................................. H02K 41/00
[52] U.S. Cl. ............................. 310/13; 310/12; 29/834
[58] Field of Search ............................... 310/12, 13, 14, 310/194, 42; 29/834, 739, 740, 743, 744, 741

[56] References Cited

U.S. PATENT DOCUMENTS

| | | | |
|---|---|---|---|
| 3,272,347 | 9/1966 | Lemelson | 414/728 |
| 4,510,683 | 4/1985 | Fedde et al. | 29/701 |
| 4,563,908 | 1/1986 | Shube | 74/2 |
| 4,653,794 | 3/1987 | Atlas | 294/88 |
| 4,661,048 | 4/1987 | Masaka et al. | 417/360 |
| 4,759,124 | 7/1988 | Snyder et al. | 29/740 X |
| 4,864,880 | 9/1989 | Grant et al. | 74/110 |
| 4,913,613 | 4/1990 | Hirschmann | 414/751 |
| 5,113,102 | 5/1992 | Gilmore | 310/88 |
| 5,175,456 | 12/1992 | Neff et al. | 310/15 |
| 5,210,933 | 5/1993 | Miyanishi et al. | 29/741 |
| 5,276,958 | 1/1994 | Larsen | 29/596 |
| 5,315,189 | 5/1994 | Neff et al. | 310/112 |
| 5,317,222 | 5/1994 | Neff et al. | 310/13 |
| 5,446,323 | 8/1995 | Neff et al. | 310/12 |

*Primary Examiner*—Steven L. Stephen
*Assistant Examiner*—Judson H. Jones
*Attorney, Agent, or Firm*—Nydegger & Associates

[57] ABSTRACT

A linear voice coil actuator using a removable electromagnetic coil includes an electrically conductive wire wound on a plastic bobbin. The wire which is wrapped around the bobbin is connected to an external power source as the electromagnetic coil is attached to the linear voice coil actuator. Current applied from the external power source causes the electromagnetic coil to selectively generate a magnetic field and, in response to generation of the magnetic field, to move translationally within a fixed magnetic field. The translational movement of the coil moves a grip which is mounted on the coil to allow the grip to selectively position and manipulate objects and things.

22 Claims, 2 Drawing Sheets

5,798,582

1

LINEAR VOICE ACTUATOR WITH REPLACEABLE MAGNETIC COIL

FIELD OF THE INVENTION

The present invention pertains generally to machines which are useful for the automated assembly of products. More specifically, the present invention pertains to electric motors which are useful for inspecting, assembling and positioning component parts in a product assembly process. The present invention is particularly, but not exclusively, useful as a replaceable magnetic coil for use in a linear voice coil actuator for the quick movement and precise positioning of component parts during an automated assembly procedure.

BACKGROUND OF THE INVENTION

Numerous devices which are useful for the automated assembly of products have been successfully used for many years. In each instance, automated assembly devices have been employed with a view toward increasing the efficiencies and accuracies of the methods, procedures and processes which are followed during the manufacture and the assembly of a completed product. Indeed, the vast majority of consumer products are now manufactured on assembly lines which incorporate automated assembly devices.

It is easy to appreciate that as the complexity of a manufactured product increases, there may also be a commensurate increase in the complexity of the machines that are required to manufacture the product. This is particularly so where the component parts are delicate or fragile and precision is important. For example, many products require the precise positioning and assembly of extremely small and light weight components in their manufacture. More specifically, these operations require precision in both the movement of the component into position and in the force with which the component is moved and assembled with other components. Where very small, fragile or light weight components are being used in the manufacturing process, and where either very light forces or normal forces are required for the assembly of these components these considerations become very important.

One type of device that is useful for automated assembly is the linear voice coil actuator. Actuators of this type may be used to move and position assembly components and offer a unique combination of compact design, light action handling and high precision movement. In general, this combination of features is not attainable using more traditional designs such as solenoids, stepper motors or pneumatic devices. For these reasons, the voice coil actuator is becoming an increasingly popular component in design and construction of automated assembly apparatus.

Structurally, linear voice coil actuators generally include an electromagnetic coil slidingly mounted to traverse through the magnetic field of a fixed-pole magnet. Electric current applied to the electromagnetic coil causes the coil to slide through the magnetic field generated by the fixed-pole magnet and the force generated by the coil and the direction of movement may be controlled by appropriate adjustments to the electric current.

A gripper or other manipulation means is attached to the coil and moves translationally with the coil. In operation, the gripper grasps an assembly component and electric current is applied to the coil to cause the coil and gripper to move or otherwise reposition the component. When the component has reached the desired destination, the gripper releases the component allowing the process to be repeated for additional components. A linear voice coil which includes these basic elements is disclosed in U.S. Pat. No. 5,315,189 which issued to Neff for an invention entitled "Actuator with Translational and Rotational Control," and which is assigned to the same assignee as the present invention.

Of the components that comprise typical linear voice coil actuators, one component, the electromagnetic coil, has been found to be particularly vulnerable to operational failure. In particular, it has been discovered that electromagnetic coils are subject to overheating due to a number of different causes. For instance, in cases where actuators are subject to microprocessor control, errors in the microprocessor software or hardware can potentially cause the actuator to adopt and hold a configuration that exceeds the design rating of the coil. If such a configuration is maintained for a long enough period, failure of the coil may result. It may be appreciated that other system failures may also result due to coil overheating and failure.

Another common source of coil failure results from simple overuse. Overuse occurs when an actuator is used in a manner that exceeds its design limitations for either speed or loading and may result in overheating and failure of the coil. A third type of failure is caused by wear induced by prolonged use. Wear of this type is often caused by inadvertent contact between the coil and the fixed-pole magnet and may result in failure of the coil over an extended period of time.

Coil failure has generally lead to the development of actuators which feature replaceable coils. Replacement of magnetic coils, however, suffers from a number of operational shortcomings. In particular, the design of most magnetic coils requires that a degree of rewiring be accomplished whenever the coil is replaced. The rewiring process is prone to error and may result in incorrectly wired coils and resulting coil failure. Even in cases where wiring errors are avoided, electromagnetic coils have proven to be difficult to replace and generally involves an expensive and time consuming process.

A second shortcoming associated with replaceable magnetic coils involves coil efficiency. In general, the electromagnetic coil of a linear voice coil actuator is designed to include a central passageway through which the fixed-pole magnet of the actuator passes. Additionally, the magnetic coil includes a series of electromagnetic coils wrapped around the exterior of the coil. It may be appreciated that high-efficiency electromagnetic coil designs require that the electromagnetic windings wrapped around the coil be positioned to closely approach the fixed-pole magnet. Unfortunately, structural and thermal requirements often dictate that the electromagnetic coil be fabricated using a material thickness that causes the electromagnetic windings to be positioned at a non-optimal distance from the fixed-pole magnet. As a result, coil efficiency suffers.

In light of the above, it is an object of the present invention to provide a replaceable magnetic coil for use in a linear voice coil actuator which features high-efficiency and resists heat induced magnetic coil failure. It is another object of the present invention to provide a replaceable magnetic coil for use in a linear voice coil actuator which can be easily installed and easily replaced. Yet another object of the present invention is to provide a replaceable magnetic coil for use in a linear voice coil actuator which may be installed without rewiring and thereby reducing installation errors. Still another object of the present invention is to provide a replaceable magnetic coil for use in a linear voice coil actuator which is relatively simple to use, is relatively easy to manufacture and is comparatively cost effective.

SUMMARY OF THE PREFERRED EMBODIMENTS

In accordance with the present invention, a replaceable electromagnetic coil for a linear voice coil actuator is provided. Structurally, the electromagnetic coil consists of a hollow bobbin wrapped in electrically conductive windings. In cooperation with the bobbin, the linear voice coil actuator includes a fixed-pole magnet which is dimensioned to pass through the hollow center of the bobbin. For the purposes of the present invention, the fixed-pole magnet is relatively long and the bobbin may slide translationally along the length of the fixed-pole magnet.

Adjacent to the fixed-pole magnet is a piston and rail assembly aligned so that the piston may slide translationally on the rail in a direction that parallels a line connecting the two poles of the fixed-pole magnet. Operationally, the bobbin is mounted to the piston so that the hollow center of the bobbin surrounds the fixed-pole magnet. Electrical current applied to the windings of the bobbin causes the bobbin to generate a magnetic field. As a result, the bobbin and piston slide translationally over the rail as the bobbin seeks to reconcile the electromagnetic fields generated by the bobbin and the fixed-pole magnet. The speed, direction and force of the translational movement is changeable by appropriate adjustments to the polarity and magnitude of the applied electric current.

A gripper or other manipulation means is attached to the piston and moves translationally with the piston and bobbin. In operation, the gripper grasps an assembly component and an electric current is applied to the windings of the bobbin to cause the piston and gripper to move or otherwise reposition the component. When the component has reached the desired destination, the gripper releases the component allowing the process to be repeated to reposition additional components.

To achieve the objectives of the present invention, the bobbin of the present invention is attached to a base. Preferably, the bobbin and base are molded as a single piece using a temperature resistant plastic. The base further includes a set of connector pins electrically attached to the electrical windings which are wrapped around the bobbin. The combination of the plastic bobbin, base and connector pins allows the bobbin assembly to be rapidly installed in the linear voice coil actuator of the present invention without danger of wiring or misalignment errors. The plastic bobbin is also thermally stable allowing the bobbin to be used at relatively high temperatures without the danger of thermal distortion of the bobbin and resulting destructive contact between the bobbin and the fixed-pole magnet.

To increase the efficiency of the present invention, the bobbin includes a number of internal ribs mounted on the interior of the bobbin's hollow passageway oriented to parallel the fixed-pole magnet. The fixed-pole magnet includes a matching set of grooves. The use of the ribs and grooves allows the bobbin to be formed from extremely thin material while still preserving the strength and thermal stability required for proper operation of the actuator. The thin-wall construction of the bobbin allows the windings of the bobbin to closely approach the fixed-pole magnet. As a result, the magnetic fields created by the windings and the fixed-pole magnet interact in a region where the field strength of the respective fields is greatest, thereby increasing the overall efficiency of the linear voice coil actuator.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
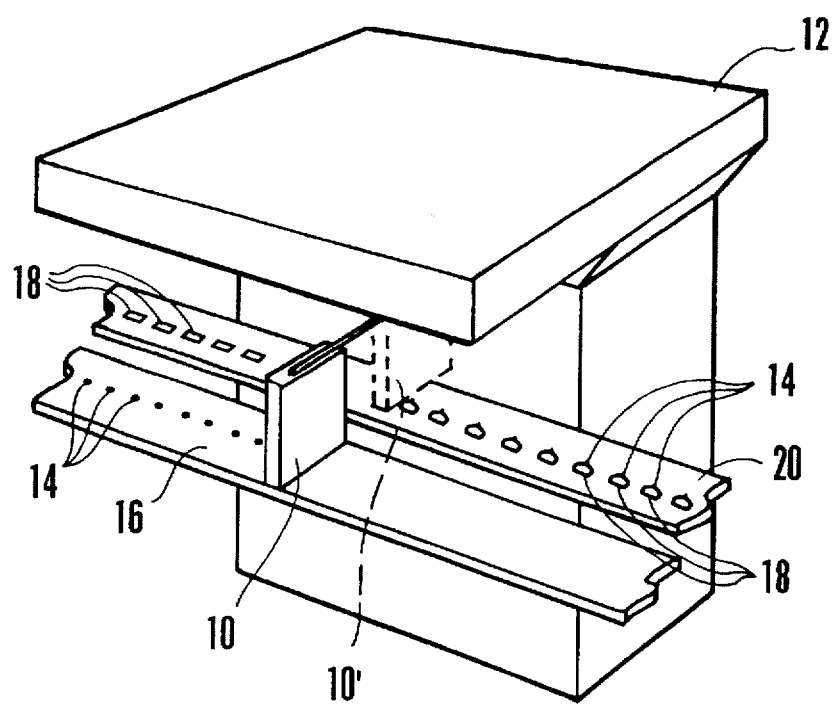
FIG. 1 is an isometric view of the present invention in its operative environment.

Referring initially to FIG. 1, the actuator device of the present invention, for moving and positioning an assembly component in an automated assembly operation, is shown in its intended environment and is designated 10. As shown, the actuator 10 is operatively mounted on an automated assembly machine 12 for movement between a position wherein the device (designated 10) retrieves a component 14 from a conveyor 16 and transports the component 14 to a position wherein the device (designated 10') places the component 14 into engagement with another end product component 18. After their assembly, the combination of components 14 and 18 is then taken by a conveyor 20 to a subsequent workstation where it is packaged or further combined with other components (not shown). As far as the actuator 10 and its operation is concerned, it is to be appreciated that the machine 12 shown in FIG. 1 is only exemplary. Indeed, the actuator 10 can be mounted on a variety of machines (not shown) for movement between a plurality of preselected positions.

Figure 2:
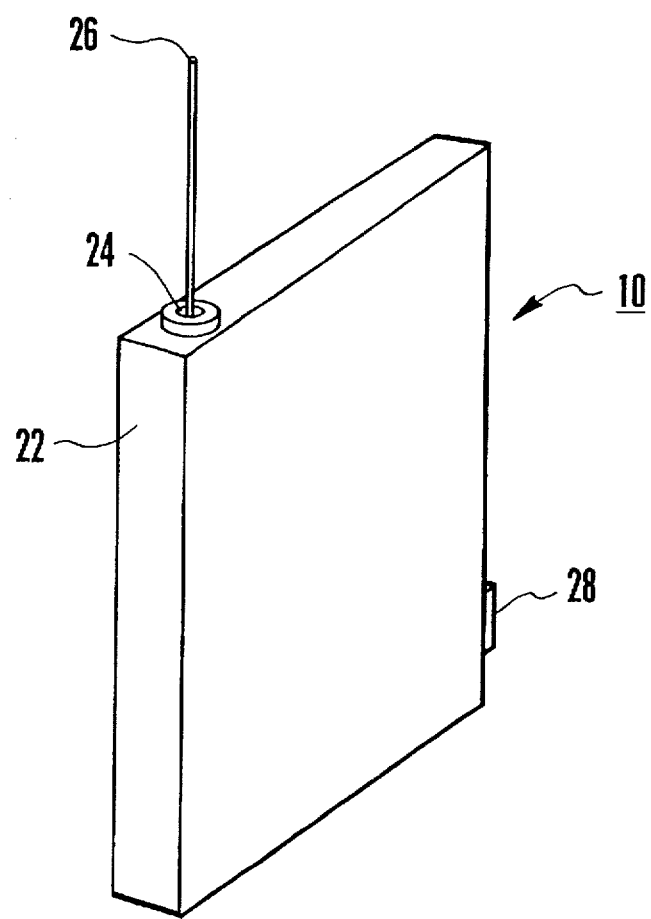
FIG. 2 is a perspective view of the linear voice coil actuator of the present invention.

Externally, and as shown in FIG. 2, the present invention includes a housing 22 which is relatively compact, and is configured and dimensioned to be comparatively flat. Importantly, though not shown in the Figures, this configuration allows the actuator 10 to be easily stacked with other such devices for improved efficiency in an automated assembly operation. FIG. 2 also shows that a grip (or rod) 24 projects through the housing 22. Specifically, for the present invention, the grip 24 is preferably an elongated tubular member which is slidingly mounted on the housing 22 and which extends through the housing 22 substantially as shown. As shown in FIG. 2, the grip 24 includes an attachment 26 useful for grasping assembly components. It will also be seen in FIG. 2 that the housing 22 is provided with an electrical inlet 28.

Figure 3:
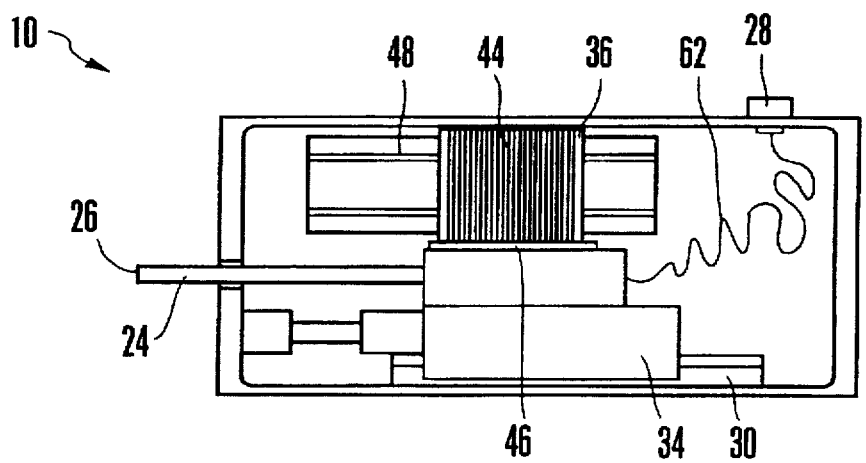
FIG. 3 is a side elevational view of a linear voice coil with portions removed and portions broken away to reveal the magnetic coil of the present invention.
Figure 5:
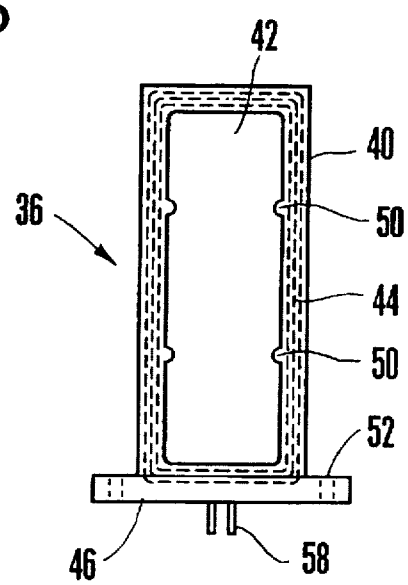
FIG. 5 is a side elevational view of the magnetic coil of the present invention showing the electrical windings in phantom.

The internal structure of the actuator 10 is, perhaps, best understood by reference to FIG. 3. In FIG. 3, it can be seen that a rail 30 and a fixed-pole magnet 32 are both fixedly attached to the housing 22. A piston assembly 34 is slidingly mounted on the rail 30 and the grip 24 is attached to the piston assembly 34. A magnetic coil 36 is also attached to the piston assembly 34 and positioned to surround the fixed-pole magnet 32. It may be appreciated that the piston assembly 34, electromagnetic coil 36 and grip 24 move reciprocally and translationally over the rail 30 and the fixed-pole magnet 32. In fact, this translational movement forms the basic movement of the actuator 10. It should also be appreciated that the translational movement of the piston assembly 34, electromagnetic coil 36 and grip 24 is caused by an interaction of an adjustable magnetic field generated by the electromagnetic coil 36 and the magnetic field generated by the fixed-pole magnet 32.

Figure 4:
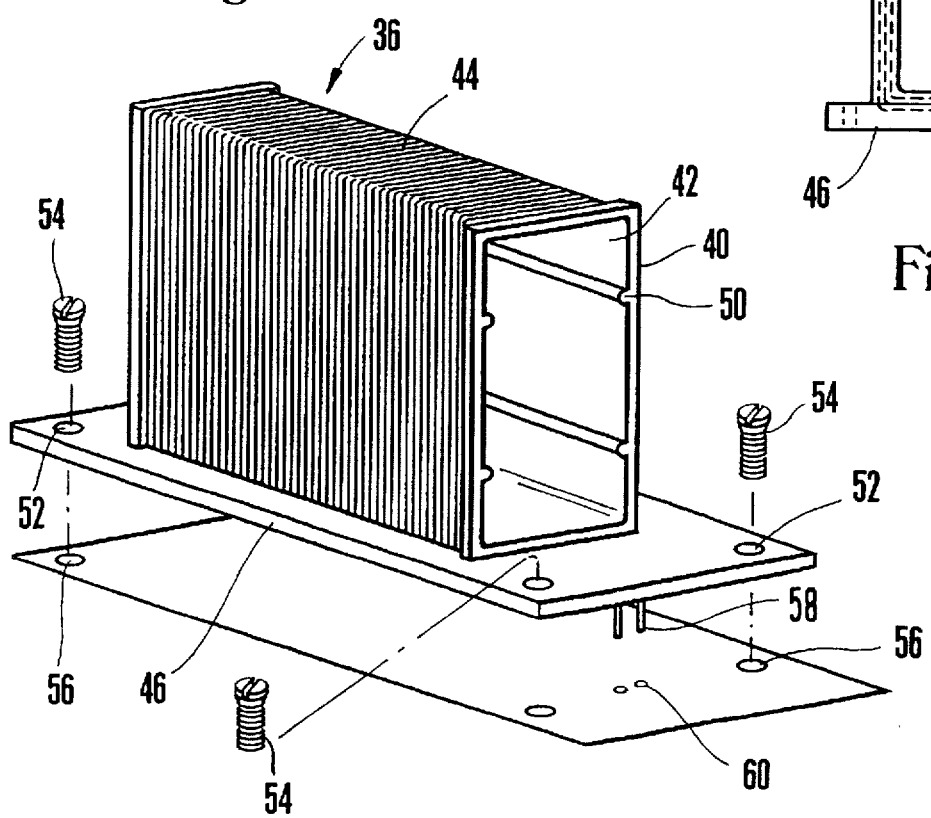
FIG. 4 is a isometric view of the magnetic coil of the present invention shown positioned over an idealized mounting point, depicting installation of the magnetic coil.

Generation of the adjustable magnetic field is the basic function of the electromagnetic coil 36. The structure and cooperation of structure that allows the electromagnetic coil 36 to fulfill this role is shown in FIG. 4 where the electromagnetic coil 36 is shown positioned over an idealized mounting point 38. In FIG. 4, it can be seen that the electromagnetic coil 36 includes a bobbin 40 formed with a passageway 42. An electrically conductive wire 44 is wound around the bobbin 40 to effectively encircle the passageway 42. The bobbin 40 is attached to a base 46 allowing the electromagnetic coil 36 to be connected to the mount point 38. Preferably, the bobbin 40 and base 46 are formed as a single piece.

Functionally, attachment of the wire 44 to an external power source (external power source not shown), creates an electric current in the wire 44. Current flow in the wire 44 necessarily results in the generation of a magnetic field and it may be appreciated that the magnitude and polarity of the magnetic field may be controlled by appropriate adjustments made to the external power source.

Interaction between the adjustable magnetic field generated by the electromagnetic coil 36 and the magnetic field generated by the fixed-pole magnet is enhanced by the passageway 42 included in the bobbin 40. In greater detail, the passageway 42 is shaped to receive the fixed-pole magnet 32 and subsequently to allow the bobbin 40 to move translationally over the exterior of the fixed-pole magnet 32. It may be appreciated that placement of the fixed-pole magnet 32 within the passageway 42 optimally positions the respective magnetic fields generated by the electromagnetic coil 36 and the fixed-pole magnet 32 so that the interaction between the two fields occurs in the regions of greatest field strength. The present invention further enhances the interaction between the fixed-pole magnet 32 and the electromagnetic coil 36 by providing a bobbin 40 which utilizes an especially thin separation between the wire 44 and the fixed-pole magnet 32. To provide this especially thin separation, the fixed-pole magnet 32 is formed with a series of grooves 48. Additionally, the bobbin 42 is formed with a corresponding series of ridges 50. Functionally, the ridges 50 allow the bobbin 42 to be fabricated using thinner material while still retaining the necessary structural integrity. The grooves 48 provide clearance for the ridges 50 as the bobbin 40 moves translationally over the fixed-pole magnet 32.

Structural integrity of the present invention is also enhanced by fabricating the electromagnetic coil 36 from materials which are relatively stable at high temperatures. To achieve this end, the bobbin 40 and the base 46 are preferably fabricated from a high-temperature plastic capable of withstanding temperatures of 180 degrees Centigrade. In a similar fashion, the electrically conductive wire 44 which is wound around the bobbin 40 is preferably chosen as a wire type capable of withstanding temperatures of 180 degrees Centigrade.

To achieve the goals of the present invention, the magnetic coil 36 is specially designed to be easily attachable and detachable from the piston assembly 34. In greater detail, it can be seen in FIG. 4 that the base 46 includes a series of mounting holes 52 through which a series of fasteners, such as screws 54, may be passed. The screws 54 are inserted into holes 56 included in the mounting point 38 retaining the electromagnetic coil 36 in attachment with the piston assembly 34.

Attachment and detachment of the electromagnetic coil 36 is simplified by a connector, e.g., a pair of lead pins 58 connected to the electrically conductive wire 44. The lead pins 58 are designed to connect with a pair of electrical contacts 60 included in the mount point 38 as the base 46 is attached to the mount point 38. In turn, the electrical contacts 60 are connected via a wiring harness 62 to the electrical inlet 28 included in the casing 22. Although not shown in the Figures, it may be appreciated that connection of an external power source to the electrical inlet 28 effectively establishes the necessary connection between the electrical power source and the electrically conductive wire 44 wound around the bobbin 40.

While the electromagnetic coil for use in a linear voice coil actuator as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

I claim:

1. A device for use with an electrical power source, the device comprising:

a magnet adapted for generating a first magnetic field;

a receptacle adapted to be electrically connected to the electrical power source; and a base and coil bobbin formed as a single piece, the bobbin being adapted for generating a second magnetic field, the bobbin including a passageway for receiving at least a portion of the magnet, said bobbin being selectively and detachably engageable with said receptacle of said electric power source to generate said second magnetic field in response to current from said electric power source, said second magnetic field being interactive with said first magnetic field to move said bobbin in said first magnetic field.

2. A device as recited in claim 1 wherein said base is formed with a plurality of mounting holes.

3. A device as recited in claim 2 further comprising a plurality of screws, each said screw insertable through a respective said mounting hole of said base and threadably attachable to said receptacle to maintain said base in attachment with said receptacle.

4. A device as recited in claim 1 wherein said base and said bobbin are constructed from a heat resistant plastic capable of withstanding temperatures up to approximately 180 degrees Centigrade.

5. A device for use with an electrical power source, the device comprising:

a magnet adapted for generating a first magnetic field;

a receptacle adapted to be electrically connected to the electrical power source;

a base; and a coil bobbin adapted for generating a second magnetic field, the bobbin including a passageway for receiving at least a portion of the magnet, said bobbin being selectively and detachably engageable with said receptacle to said electric power source to generate said second magnetic field in response to current from said electric power source, said second magnetic field being interactive with said first magnetic field to move said bobbin in said first magnetic field;

wherein said magnet is formed with a plurality of grooves, said grooves oriented substantially parallel to said movement to said bobbin.

6. A device as recited in claim 5 wherein said bobbin is formed with a plurality of reinforcing ribs, each said rib positioned and oriented to slidingly move in a respective said groove as said bobbin moves over said magnet.

7. A device as recited in claim 6 wherein said bobbin comprises a wire coiled on said bobbin and at least partly encircling said passageway, said wire having a first end and a second end, said first end and second end of said wire being selectively engageable with said receptacle of said power source.

8. A device as recited in claim 7 wherein said wire is constructed of a heat resistant wire capable of withstanding temperatures up to approximately 180 degrees Centigrade.

9. A linear voice coil actuator which comprises:

a support structure;

a pair of electrical contacts secured to said support structure;

a magnet secured to said support structure;

a coil bobbin formed with a passageway, said magnet being at least partly, slidably insertable into said passageway for reciprocal movement of said bobbin over at least a portion of said magnet; and a wire coiled on said bobbin and at least partly encircling said passageway, said wire having a first end and a second end, said first and second ends of said wire being selectively engageable with said electrical contacts for movement of said bobbin over said magnet in response to electrical current flow through said wire.

10. A device as recited in claim 9 wherein said electrical contacts are slidingly secured to said support structure for reciprocal translational movement of said electrical contacts.

11. A device as recited in claim 10 further comprising a base attached to said coil bobbin, said base selectively attachable to said electrical contacts for reciprocal translational movement with said electrical contacts.

12. A device as recited in claim 11 wherein said base is formed with a plurality of mounting holes.

13. A device as recited in claim 12 further comprising a plurality of screws, each said screw insertable through a respective said mounting hole of said base and threadably attachable to said support structure to maintain said base in attachment with said support structure.

14. A device as recited in claim 11 wherein said bobbin and said base are formed as a single piece.

15. A device as recited in claim 11 further comprising a pair of pins attached to said base, each said pin being electrically connected to one of the ends of the wire, the pins being insertable into the electrical contacts to selectively, electrically connect the wire to the electrical contacts.

16. A device as recited in claim 9 wherein said magnet is formed with a plurality of grooves, said grooves oriented substantially parallel to said movement of said bobbin over said magnet.

17. A device as recited in claim 16 wherein said bobbin is formed with a plurality of reinforcing ribs, each said rib positioned and oriented to slidingly move in a respective said groove as said bobbin moves over said magnet.

18. A linear voice coil actuator for use with a power source, the actuator comprising:

a housing;

a magnet attached to said housing and adapted for generating a first magnetic field;

a piston assembly slidingly attached to said housing for reciprocal translational movement;

at least one electrical contact attached to the piston assembly, the electrical contact being electrically connected to the power source;

a coil bobbin attached to said piston assembly for movement therewith, said coil bobbin being formed with a passageway and positioned to receive at least a portion of said permanent magnet in said passageway, said permanent magnet being slidably insertable into said passageway for reciprocal movement of said bobbin relative to said magnet;

a wire coiled on said bobbin and at least partly encircling said passageway; and a connector mounted on said coil bobbin, said connector being in electrical contact with said wire and selectively engaging the electrical contact for electrically connecting said wire to the power source to selectively establish an electric current in said wire to generate a second magnet field, said selectively generated second magnetic field interacting with said first magnetic field to move said coil bobbin translationally relative to the magnet.

19. A replaceable coil for use in a voice coil actuator, the actuator including a magnet adapted for generating a first magnetic field and an electrical power source being electrically connected to a pair of electrical contacts, the coil comprising:

base formed with a bobbin, said bobbin adapted for generating a second magnetic field attached to the base, the bobbin including a passageway for receiving at least a portion of the magnet, the second magnetic field being generated in response to current from the electric power source, the second magnetic field being interactive with the first magnetic field to move the bobbin; and a connector which is selectively and detachably engageable with the electrical contacts of the electric power source to selectively and detachably connect the bobbin to the electrical power source.

20. The replacement coil of claim 19 wherein the connector includes a first pin and a second pin and the bobbin includes a wire coiled on the bobbin to surround said passageway, the wire having a first end which is electrically connected to a first pin and a second end which is connected to the second pin, the first and second pins being selectively and detachably engageble with the electrical contacts.

21. The replacement coil of claim 19 wherein the bobbin is formed with a plurality of ribs, each rib is sized and shaped to be positioned within a groove in the magnet.

22. An actuator including the replacement coil of claim 19.

* * * * *